United States Patent
Kim et al.

(10) Patent No.: US 9,314,818 B2
(45) Date of Patent: Apr. 19, 2016

(54) METHOD AND DEVICE FOR RESTORING AND MAINTAINING SUPERHYDROPHOBICITY UNDER LIQUID

(75) Inventors: Chang-Jin Kim, Beverly Hills, CA (US); Choongyeop Lee, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 13/811,272

(22) PCT Filed: Jul. 22, 2011

(86) PCT No.: PCT/US2011/045106
§ 371 (c)(1),
(2), (4) Date: Jan. 20, 2013

(87) PCT Pub. No.: WO2012/015700
PCT Pub. Date: Feb. 2, 2012

(65) Prior Publication Data
US 2013/0122195 A1 May 16, 2013

Related U.S. Application Data

(60) Provisional application No. 61/368,188, filed on Jul. 27, 2010.

(51) Int. Cl.
*D06N 7/04* (2006.01)
*G11B 5/64* (2006.01)
(Continued)

(52) U.S. Cl.
CPC ... *B05D 5/00* (2013.01); *B05C 7/00* (2013.01); *B05C 9/00* (2013.01); *B08B 17/06* (2013.01);
(Continued)

(58) Field of Classification Search
CPC .......... B82Y 30/00; B82Y 40/00; B05D 5/00; B05D 3/10; B05D 3/101; B05D 3/105; Y02T 70/121; Y02T 70/122; Y02T 70/123
USPC .................................. 428/141, 147; 977/707
See application file for complete search history.

(56) References Cited

U.S. PATENT DOCUMENTS 3,069,336 A * 12/1962 Tait et al. ...................... 205/731
7,044,073 B2 5/2006 Goldstein
(Continued)

FOREIGN PATENT DOCUMENTS

CN 101767629 A 7/2010
DE 10144259 A1 3/2003
(Continued)

OTHER PUBLICATIONS

Choongyeop Lee; Chang-Jin "CJ" Kim, "Maximizing the Giant Liquid Slip on Superhydrophobic Microstructures by Nanostructuring their Sidewalls", Jul. 17, 2009, Langmuir, 25, 12812-12818.*
(Continued)

*Primary Examiner* — Prashant J Khatri
*Assistant Examiner* — Travis Figg
(74) *Attorney, Agent, or Firm* — Vista IP Law Group LLP

(57) ABSTRACT

A superhydrophobic surface includes a plurality of microfeatures disposed on a substrate and a gas generator disposed within the microfeatures, the gas generator configured to generate a gas within the microfeatures. Gas is generated within the microfeatures when at least a portion of the microfeatures is in a wetted state to restore the microfeatures to a dewetted state. Gas generation is self-regulating in that gas generation automatically starts when a wetted condition exists and stops when sufficient gas has been generated to recover a dewetted state that restores superhydrophobicity.

16 Claims, 8 Drawing Sheets

(51) Int. Cl.
*B05D 5/00* (2006.01)
*B08B 17/06* (2006.01)
*C09D 5/16* (2006.01)
*B05C 7/00* (2006.01)
*B05C 9/00* (2006.01)
*C25D 9/00* (2006.01)
*C25D 17/00* (2006.01)
*B82Y 30/00* (2011.01)

(52) U.S. Cl.
CPC ............... *B08B 17/065* (2013.01); *B82Y 30/00* (2013.01); *C09D 5/1681* (2013.01); *C25D 9/00* (2013.01); *C25D 17/00* (2013.01); *Y10T 428/24355* (2015.01)

(56) References Cited

U.S. PATENT DOCUMENTS

| | | | |
|---|---|---|---|
| 7,150,904 | B2 | 12/2006 | D'Urso et al. |
| 7,449,649 | B2 | 11/2008 | Gasparyan et al. |
| 7,459,197 | B2 * | 12/2008 | Aizenberg et al. ............ 428/141 |
| 8,287,808 | B2 | 10/2012 | Krupenkin et al. |
| 8,680,497 | B2 | 3/2014 | Cho et al. |
| 2006/0029808 | A1 * | 2/2006 | Zhai et al. ...................... 428/412 |
| 2006/0115623 | A1 | 6/2006 | Aizenberg et al. |
| 2007/0059213 | A1 * | 3/2007 | Aizenberg et al. .............. 422/99 |
| 2009/0078326 | A1 | 3/2009 | Rosario et al. |
| 2010/0028604 | A1 | 2/2010 | Bhushan et al. |
| 2010/0166964 | A1 | 7/2010 | Go et al. |
| 2010/0330340 | A1 | 12/2010 | Rothstein et al. |

FOREIGN PATENT DOCUMENTS

| | | |
|---|---|---|
| JP | 09-262563 | 10/1997 |
| WO | 2006109583 | 10/2006 |
| WO | WO 2008/066828 A2 | 6/2008 |
| WO | WO 2008/147568 A1 | 12/2008 |

OTHER PUBLICATIONS

Xue Hua Zhang; Aunthony Quinn; William A. Ducker, "Nanobubbles at the Interface Between Water and a Hydrophobic Solid", 2008, Langmuir, 24, 4756-4764.*
Krupenkin et al. "Reversible Wetting-Dewetting Transitions on Electrically Tunable Superhydrophobic Nanostructured Surfaces" Langmuir, 2007, 23, 9128-9133.*
Lee et al. "Structured Surfaces for a Giant Liquid Slip" Phys. Rev. Let., 2008, 101, 064501-1-064501-4.*
Zhang et al. "Nanobubbles at the Interface Between Water and a Hydrophobic Solid" Langmuir, 2008, 24, 4756.*
Krupenkin et al. ("Reversible Wetting-Dewetting Transitions on Electrically Tunable Superhydrophobic Nanostructured Surfaces" Langmuir, 2007, 23, 9128-9133).*
Definition of Circuit.*
Definition of Electrolytic.*
Kim et al. "Maximizing the Giant Liquid Slip on Superhydrophobic Microstructures by Nanostructuring Their Sidewalls" Langmuir, 2009, 24, 12812-12818; published on the web Jul. 17, 2009.*
Goldstein et al. "The Effects of Trapped Bubbles on Viscous Drag Reduction for Submerged Surfaces" AIAA, 2007, 1-14.*
Definition of immersed.*
PCT International Preliminary Report on Patentability (Chapter I of the Patent Cooperation Treaty) for PCT/US2011/045106, Applicant: The Regents of the University of California, Form PCT/IB/326 and 373, dated Feb. 7, 2013 (5pages).
Choi, Chang-Hwan et al., Large Slip of Aqueous Liquid Flow over a Nanoengineered Superhydrophobic Surface, Physical Review Letters, vol. 96, 066001, 2006.
Daniello, Robert J. et al., Drag reduction in turbulent flows over superhydrophobic surfaces, Physics of Fluids, vol. 21, 085103, 2009.
Krupenkin, Tom N. et al., Reversible Wetting-Dewetting Transitions on Electrically Tunable Superhydrophobic Nanostructured Surfaces, Langmuir, vol. 23, pp. 9128-9133, 2007.
Lee, Choongyeop et al., Maximizing the Giant Liquid Slip on Superhydrophobic Microstructures by Nanostructuring Their Sidewalls, Langmuir, vol. 25, 12812-12818, 2009.
Lee, Choongyeop et al., Structured Surfaces for a Giant Liquid Slip, Physical Review Letters, vol. 101, 064501, 2008.
Nosonovsky, Michael et al., Patterned Nonadhesive Surfaces: Superhydrophobicity and Wetting Regime Transitions, Langmuir, vol. 24, pp. 1525-1533, 2008.
Zheng, Q.S. et al., Effects of Hydraulic Pressure on the Stability and Transition of Wetting Modes of Superhydrophobic Surfaces, Langmuir, vol. 21, pp. 12207-12212, 2005.
PCT International Search Report for PCT/US2011/045106, Applicant: The Regents of the University of California, Form PCT/ISA/210 and 220, dated Mar. 28, 2012 (5pages).
PCT Written Opinion of the International Search Authority for PCT/US2011/045106, Applicant: The Regents of the University of California, Form PCT/ISA/237, dated Mar. 28, 2012 (3pages).
Choi, Chang-Hwan et al., Large Slip of Aqueous Liquid Flow over a Nanoengineered Superhydrophobic Surface, PRL 96, 066001-1-066001-4 (2006).
Daniello, Robert J et al., Drag reduction in turbulent flows over superhydrophobic surfaces, Physics of Fluids 21, 085103 (2009).
Erbil, H. Yildirim et al., Transformation of a Simple Plastic into Superhydrophobic Surface, Science, vol. 299, (2003).
Krupenkin, Tom N. et al., Reversible Wetting-Dewetting Transitions of Electrically Tunable Superhydrophobic Nanostructured Surfaces, Langmuir, 23, 9128-9133 (2007) Supporting Information (pp. 1-7).
Kupenkin, Tom N. et al., Reversible Wetting-Dewetting Transition on Electrically Tunable Superhydrophobic Nanostructured Surfaces, Langmuir 2007, 23, 9128-9133.
Lee, Choongyeop et al., Structured Surfaces for a Giant Liquid Slip, PRL 101, 064501-1-064501-4 (2008).
Lee, S. et al., Micro-fabricated electrolytic micro-bubblers, Intl, Journal of Multiphase Flow, 31, 706-722 (2005).
Marr, Kevin C., Drag Reduction on a Flat Plate by Trapping Bubbles on the Surface, Thesis, The University of Texas at Austin, (2005) (96pages).
Stephani, Kelly A. et al., An Examination of Trapped Bubbles for Viscous Drag Reduction on Submerged Surfaces, Journal of Fluids Eng., vol. 132, 041303-1-041303-9 (Apr. 2010).
Stephani, Kelly A. et al., Drag Reduction using Trapped Bubbles on a Flat Plate Surface, 3rd AIAA Flow Control Conference, San Francisco, CA (2006), (19pages).
Stephani, Kelly A. et al., The Effects of Trapped Bubbles on Viscous Drag Reduction for Submerged Surfaces, 37th AIAA Fluid Dynamics Conference and Exhibit, Miami, FL (2007) (14pages).
Zhang, Xue Hua et al., Nanobubbles at the Interface between Water and a Hydrophobic Solid, Langmuir 2008, 24, 4756-4764.
Office Communication from the Chinese Patent Office dated Dec. 1, 2014 issued in Chinese Patent Application No. 2011800466557, Applicant, The Regents of the University of California (8pages) including an English Translations prepared by Kangxin Partners (11pages).
Office Communication from the European Patent Office including extended European Search Report dated Sep. 30, 2014 issued in European Patent Application No. 11812989.9-1703, Applicant: The Regents of the University of California (11pages).
Second Office Action issued by the Chinese Patent Office dated Aug. 12, 2015 in Chinese Patent App No. 201180046655.7 includes English translations (7pages).
Office Action issued by the Japanese Patent Office dated Oct. 6, 2015 in Japanese Patent App No. 2013-521859 includes English translations (19pages).

* cited by examiner

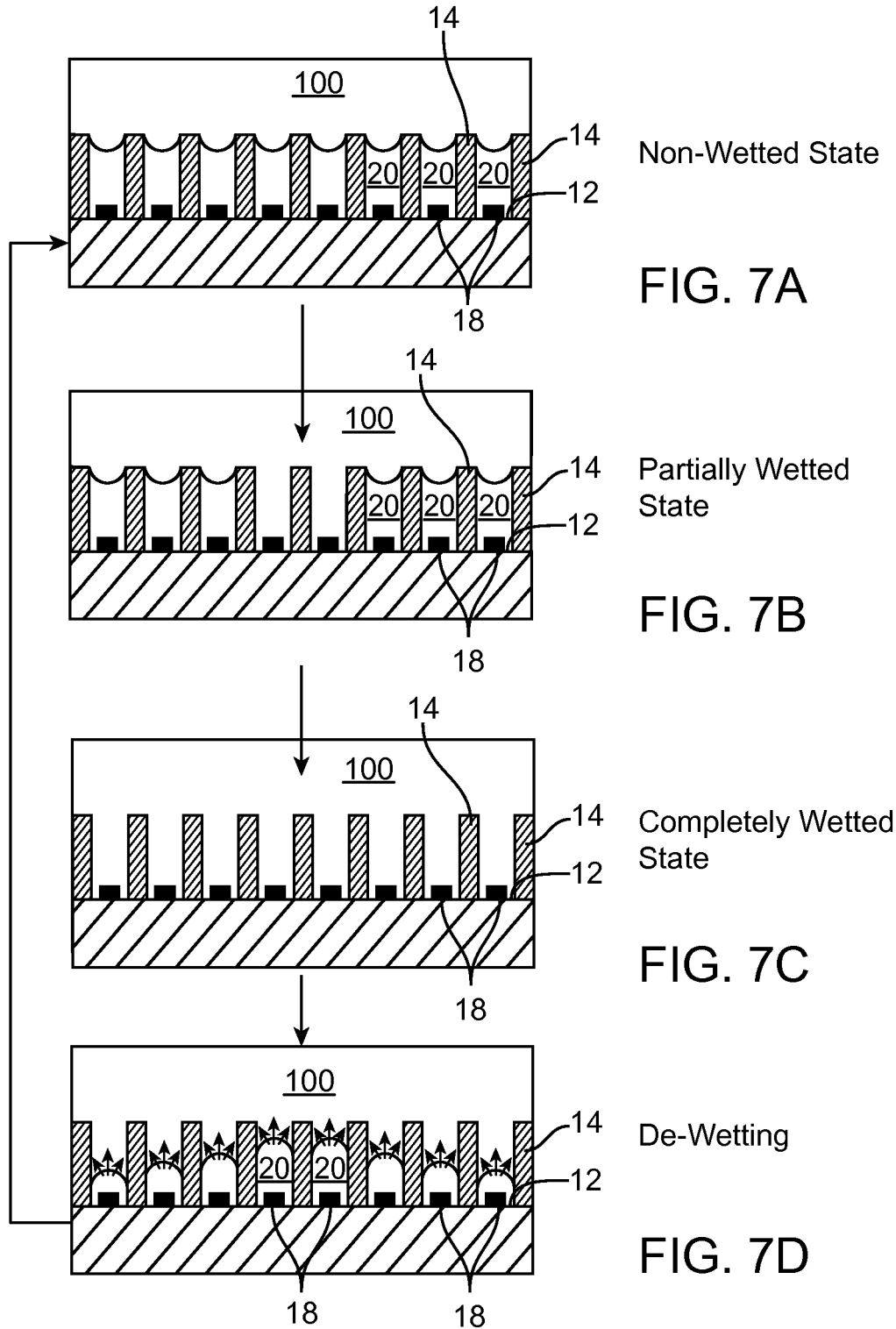

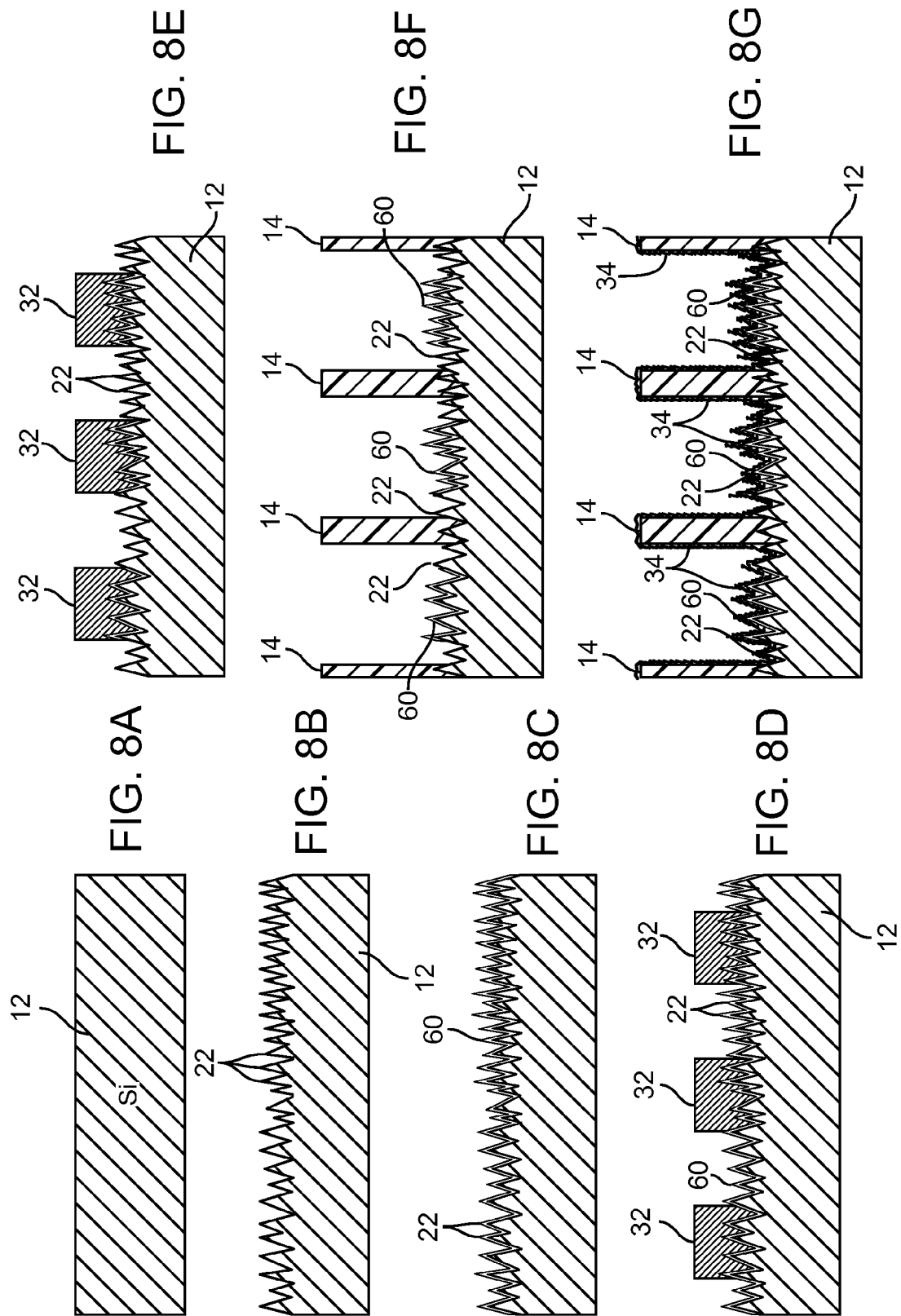

METHOD AND DEVICE FOR RESTORING AND MAINTAINING SUPERHYDROPHOBICITY UNDER LIQUID

This Application is a U.S. National Stage filing under 35 U.S.C. §371 of International Application No. PCT/US2011/045106, filed Jul. 22, 2011, which claims priority to U.S. Provisional Patent Application No. 61/368,188 filed on Jul. 27, 2010. The contents of the aforementioned applications are hereby incorporated herein by reference in their entirely. Priority to the aforementioned applications are hereby expressly claimed in accordance with 35 U.S.C. §§119, 120, 365 and 371 and any other applicable statutes.

STATEMENT REGARDING FEDERALLY SPONSORED RESEARCH AND DEVELOPMENT

This invention was made with Government support under 0103562, awarded by the National Science Foundation. The Government has certain rights in the invention.

RELATED APPLICATION

This Application claims priority to U.S. Provisional Patent Application No. 61/368,188 filed on Jul. 27, 2010. Priority is claimed pursuant to 35 U.S.C. §119. The above-noted Patent Application is incorporated by reference as if set forth fully herein.

FIELD OF THE INVENTION

The field of the invention generally relates to methods and devices that use superhydrophobic surfaces and more particularly to methods and devices that maintain superhydrophobicity on superhydrophobic surfaces that are submerged in liquid.

BACKGROUND

By today's convention, a superhydrophobic (SHPo) surface is defined as a solid surface on which water in air forms a contact angle greater than 150 degrees. Such high contact angles have so far been found only on structured hydrophobic surfaces, the structures typically in micrometers. A typical demonstration of SHPo surfaces is water droplets rolling around on them with little resistance. Recently, SHPo surfaces have shown promise when submerged in water (i.e., no droplet) as well because their surface structures or microfeatures can hold a gas film under water. One compelling application is drag reduction, as the gas held within (in between) the microfeatures lubricates water flows on them, effectively allowing the water to slip on the surface. How slippery a liquid flows on a solid surface is quantitatively defined as slip length, which had never been found to be more than 1 micrometer (too small to be useful) until the advent of SHPo surfaces. Some SHPo surfaces have even demonstrated effective slip lengths in hundreds of micrometers, which are large enough to benefit even regular (i.e., large) fluidic systems. Drag reduction for turbulent flows has also been reported. For drag reduction, SHPo surfaces are considered a superior alternative to the existing bubble injection method because the stable gas upon the surfaces makes the SHPo method passive (i.e., energy efficient) and simple (i.e., easy to implement). Moreover, it has been shown that the minimized solid-liquid contact on SHPo surfaces can resist surface fouling, especially biofouling. Despite its great potential, drag reduction by SHPo surfaces has been considered strictly limited to laboratory conditions because there was no indication that such SHPo surfaces could retain the gas layer long enough under real conditions.

SHPo surfaces are not SHPo anymore once they become wetted (i.e., the liquid enters in between the microfeatures), thereby losing their beneficial properties (e.g., water repellency, drag reduction, biofouling prevention). Because the wetting transition of a SHPo surface inside a liquid is spontaneous, any liquid impregnation, incited by various instigators, has an irrevocable effect against drag reduction. FIG. 1, for example, illustrates the transition of a SHPo surface from a non-wetted state (top) to a wetted state (bottom). For example, the surface may get wet and lose its slip effect if it has defects, the liquid is under pressure, or the gas within the microfeatures diffuses away to the liquid over time. Once the SHPo surface has become wetted as illustrated in FIG. 1, the superhydrophobicity and its attendant benefits in reduction in drag, etc. are lost.

Recently, several approaches have been suggested to increase the stability of the gas layer on a SHPo surface against liquid pressure. For example, a gas layer can be pneumatically pressurized either actively or passively so that it can withstand elevated liquid pressures. Alternatively, hierarchically structures have been employed to make SHPo surfaces more resistant to liquid pressure. These previous improvements do not work unless the liquid pressure is relatively small (e.g., even 0.5 atm is too high). Moreover, these approaches are only preventive measures. They are ineffective once the gas layer is disrupted. The ability to maintain superhydrophobicity under various adverse conditions is needed to utilize SHPo surface in real applications. More desirable for robustness is the ability to restore superhydrophobicity even after the surface becomes wetted by unexpected events. A successful scheme should be able to displace the liquid that has impregnated the surface structures with new gas and restore a stable gas film.

SUMMARY

In one embodiment, a SHPo surface includes a substrate having an array of microfeatures disposed thereon and a gas generator disposed within the microfeatures, the gas generator configured to generate a gas in between the microfeatures. Gas is generated within the microfeatures when at least a portion of the surface is in a wetted state to restore the surface to a dewetted state. Gas generation may be self-regulating in that gas generation automatically starts when a wetted condition exists and stops when sufficient gas has been generated to recover a dewetted state that restores superhydrophobicity.

The gas generator may include one or more electrodes, a chemical reactant (e.g., agent), or a heating element. In the electrode embodiment, the electrode generates gas by the electrolysis of liquid (typically water). The gas generation is self-regulating in that electrolysis begins when a portion of the microfeatures is in a wetted state and stops as soon as the wetted microfeatures become dewetted.

The SHPo surface includes a first electrode disposed within the microfeatures and a second electrode disposed in contact with the liquid. The electrodes are connected to an electric power source. When a portion of the microfeatures is in a wetted state, the two electrodes are in electric communication, closing an electrolytic circuit to start electrolysis. When the microfeatures are in a de-wetted state, the gas within the microfeatures separates the two electrodes electrically, opening the electrolytic circuit to stop the electrolysis.

In another embodiment, method of restoring or maintaining superhydrophobicity in liquid on a superhydrophobic surface having an array of microfeatures disposed thereon includes generating a gas within the microfeatures when at least a portion of the microfeatures is in a wetted state to restore the microfeatures to a dewetted state.

BRIEF DESCRIPTION OF THE DRAWINGS

FIG. 7A illustrates a side view of a SHPo surface in a non-wetted state.

FIG. 7B illustrates a side view of a SHPo surface in a partially wetted state.

FIG. 7C illustrates a side view of a SHPo surface in a completely wetted state.

FIG. 7D illustrates a side view of a SHPo surface during dewetting process.

FIGS. 8A-8G illustrate a method of creating a SHPo surface according to one embodiment.

DETAILED DESCRIPTION OF THE ILLUSTRATED EMBODIMENTS

Figure 1:
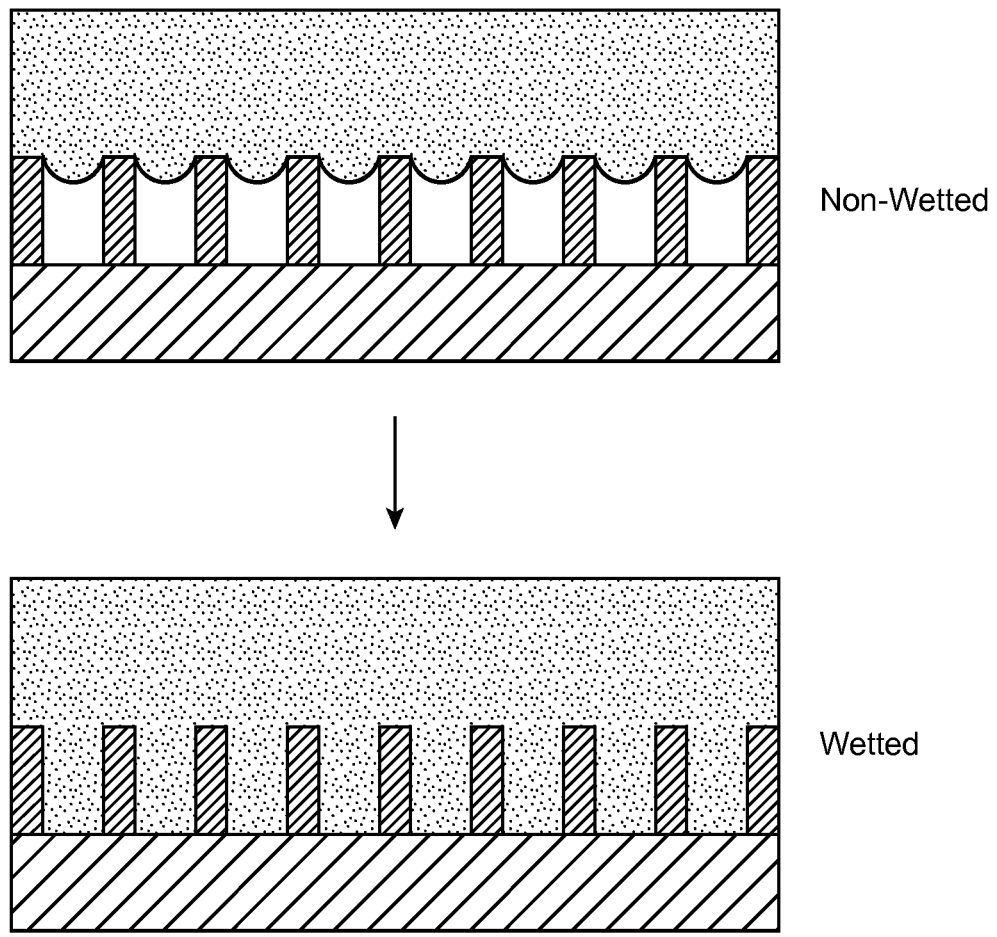
FIG. 1 illustrates a side view of a SHPo surface according to the prior art that becomes fully wetted from an initial non-wetted state.
Figure 2:
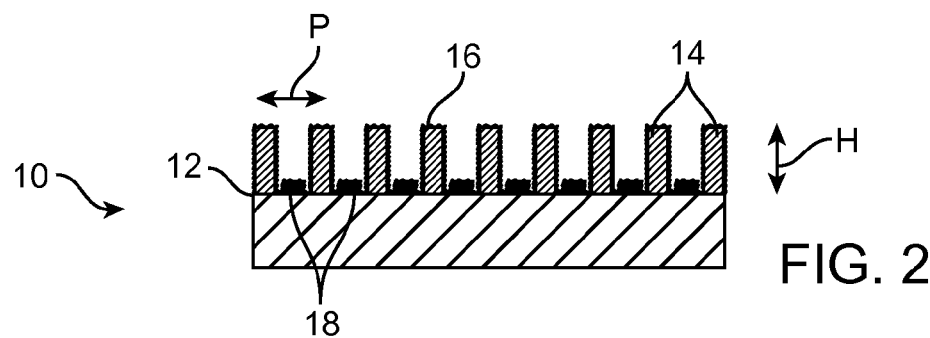
FIG. 2 illustrates a side view of a SHPo surface according to one embodiment of the invention.
Figure 5:
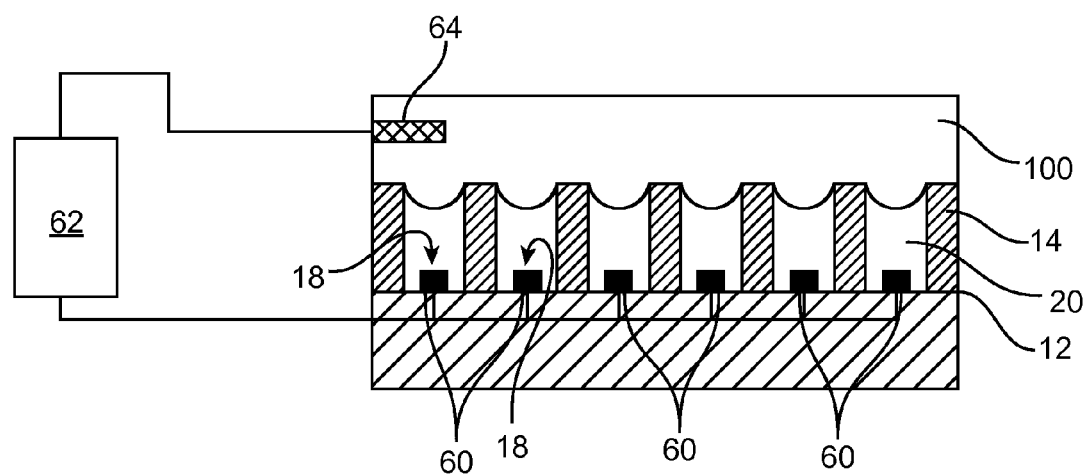
FIG. 5 illustrates a side view of a SHPo surface according to another embodiment of the invention.

FIG. 2 illustrates a superhydrophobic (SHPo) surface 10 according to one embodiment. It should be understood that superhydrophobic or SHPo as used herein refers to the ability of the surface to be very non-wetting to a liquid. This may include liquid as water, oil, or other solvent. The SHPo surface 10 includes a substrate 12 having a plurality of microfeatures 14 disposed thereon. The microfeatures 14 are generally oriented substantially orthogonal to the substrate 12. Microfeatures 14 means, when used herein, microscopic features; they are commonly in micrometer scale but can be in smaller or larger scale. The microfeatures 14 may be arranged in an array or random configuration. The substrate 12 may be formed from any number of materials but, as explained below, may include silicon if semiconductor-processing techniques are used to form the SHPo surface 10. The microfeatures 14 have a height (H) as shown by the arrow H in which they project relative to the substrate 12. The height (H) may vary but typically is tens of microns (e.g., H=50 μm) for dynamic applications such as drag reduction and smaller for static applications such as anti-fouling. The microfeatures 14 are separated from one another by a distance. The pitch (P) is center-center distance to the nearest neighbor microfeature 14 and is illustrated by the arrow P in FIG. 2. When the space between neighboring microfeatures 14 is filled with a gas 20, a meniscus is formed that may sag as illustrated in FIGS. 5, 7A, and 7B or bulge up (not shown in the FIGS.), depending on the pressure difference between the liquid and the gas. The height (H) of the microfeatures 14 should be high enough such that the sagging meniscus does not touch the substrate 12. This height is also a function of the pitch (P)

The microfeatures 14 may be formed from the same or different material from the surface 12. For instance, in some embodiments, the microfeatures 14 may be formed from a photoresist (PR) or the like. The microfeatures 14 may be made from a material that is particularly hydrophobic. Alternatively, at least some portions of the microfeatures 14 may be coated with a hydrophobic coating 16 such as polytetrafluoroethylene (PTFE) or the like.

Figure 3:
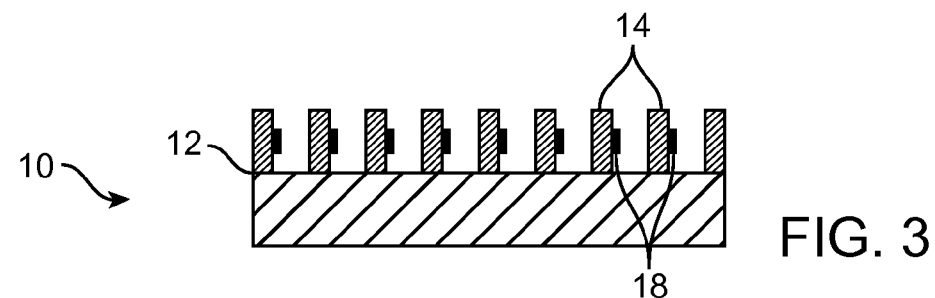
FIG. 3 illustrates a side view of a SHPo surface according to another embodiment of the invention.

Still referring to FIG. 2, the SHPo surface 10 includes a gas generator 18 that is disposed within the microfeatures 14. The gas generator 18 is configured to generate a gas 20 in between the microfeatures 14. The microfeatures 14 are spaced such that gas 20 that is generated by the gas generator 18 is trapped and grows within the localized space or well formed between adjacent microfeatures 14. Once the gas 20 has grown in size to the top of the microfeatures 14 the gas proceeds to extend laterally across the SHPo surface 10. In this regard, as explained in more detail below, the SHPo surface 10 can be restored from a partially or fully wetted state back into a non-wetted state. In one embodiment, the gas generator 18 is disposed on or embedded in the substrate 12. FIG. 2 illustrates the gas generator 18 on the substrate 12 within the space formed between adjacent microfeatures 14. Alternatively, as seen in FIG. 3, the gas generator 18 is located on the side of the microfeatures 14.

The gas generator 18, in one embodiment, is an electrode 60. The electrode 60 may be operatively coupled to a source of electric power 62 as illustrated in FIG. 5. The source of electric power 62 is also connected to an electrode 64. As seen in FIG. 5, the SHPo surface 10 is immersed in liquid 100. In this embodiment, the gas 20 that is generated on the electrode 60 by electrolysis of water as the liquid is hydrogen ($H_2$) or oxygen ($O_2$) depending on the polarity of the electrical connection. Other gases (e.g., chorine) may be generated depending on the liquid. The gas 20 that is generated by the electrode 60 is trapped and grows in the localized space or well formed between adjacent microfeatures 14. It should be noted that gas generation is self-regulated in this embodiment. In particular, the electrolytic circuit is "closed" and gas generation occurs only if the SHPo surface 10 becomes partially or fully wetted. Once liquid 100 invades the space between adjacent microfeatures 14 the circuit closes and current flows to initiate the electrolytic reaction, thereby liberating gas 20 within the microfeatures 14. After sufficient gas generation, the electrolytic circuit then becomes "open" and the electrolytic reaction stops. FIG. 5, for instance, illustrates an open state of the circuit because the SHPo surface 10 is either non-wetted or dewetted after triggering gas generation. This feature is particularly advantageous because there is no need for any sensing and controlling circuitry to switch the gas generator 18 on or off.

In still another embodiment, the gas generator 18 may include a chemical reactant (e.g., agent). The chemical reactant, when exposed to a reactant which may be a liquid or something contained within a liquid, generates a gas 20. This gas 20 is then used to restore superhydrophobicity to the SHPo surface 10. For instance, the chemical agent may react with water or some other reactant contained in the water. Again, gas generation that occurs is self-regulating. Gas is generated only when the SHPo surface 10 becomes wetted and stops once the dewetted state has been established. In yet another embodiment, the gas generator 18 may include a heating element. The heating element heats any liquid entering into the microfeatures 14 by wetting and creates localized boiling. The gas 20 (vapor) generated as a result of this localized boiling then restores the wetted SHPo surface 10 to a dewetted state. Again, gas generation that occurs is self-regulating.

Figure 4A:
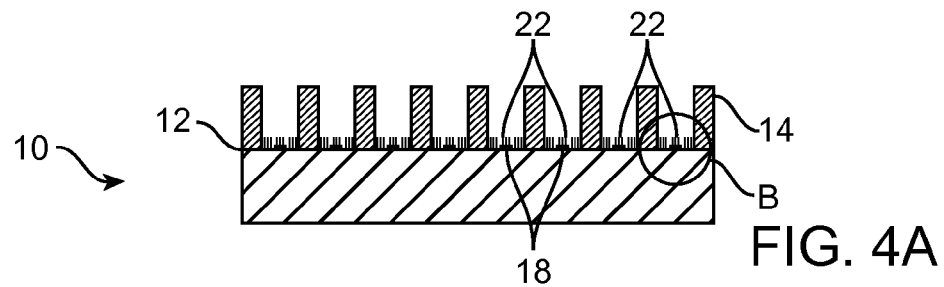
FIG. 4A illustrates a side view of a SHPo surface according to another embodiment of the invention.
Figure 4B:
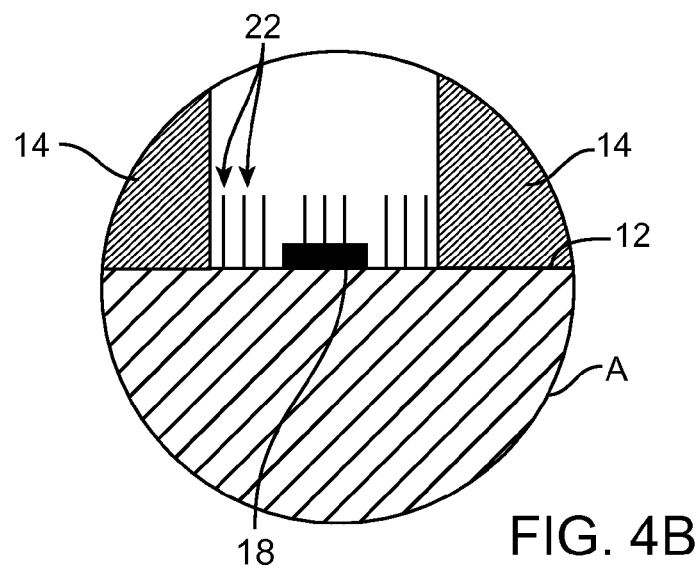
FIG. 4B illustrates a magnified view of the circular region B of FIG. 4A.
Figure 9A:
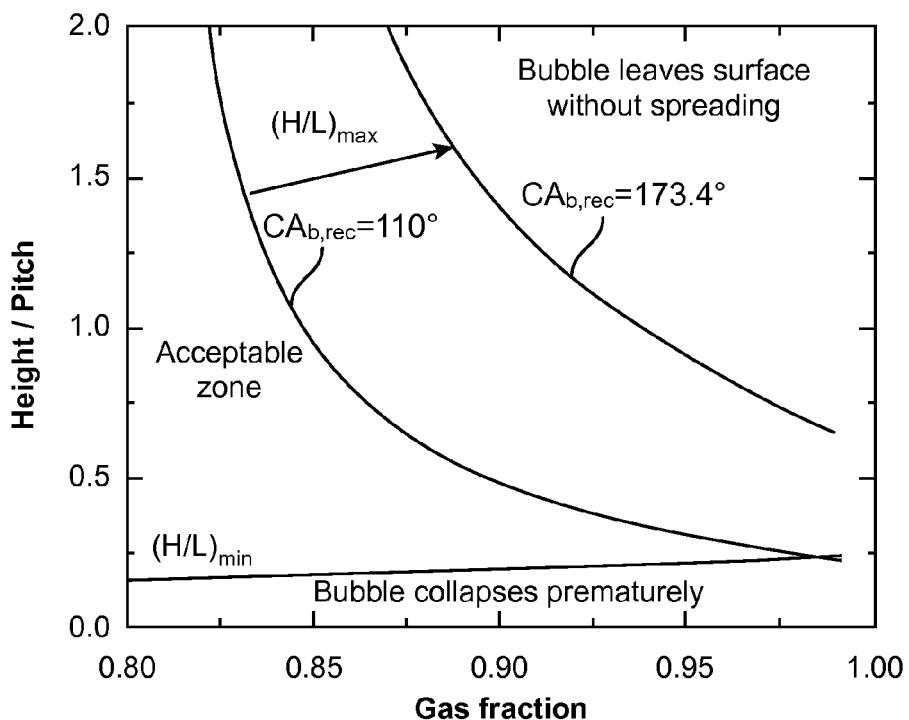
FIG. 9A illustrates the acceptable values of height/pitch ratio as a function of gas fraction and the contact angle on the substrate as a parameter for a SHPo surface comprising post microfeatures.
Figure 9B:
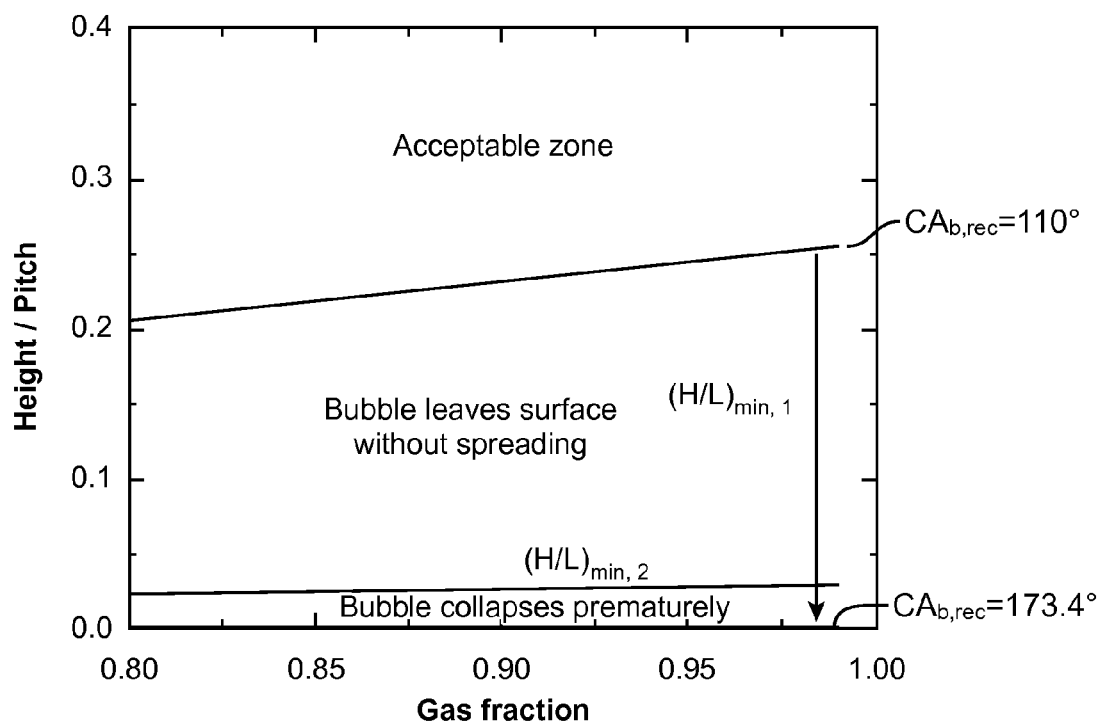
FIG. 9B illustrates the acceptable values of height/pitch ratio as a function of gas fraction and the contact angle on the substrate as a parameter for a SHPo surface comprising grate microfeatures.

FIG. 4A and FIG. 4B illustrate another embodiment of the SHPo surface 10. In this embodiment, nanofeatures 22 are disposed on the substrate 12. The nanofeatures 22 are, as their name implies, small projections or the like that have dimensions that are significantly smaller than the microfeatures 14 (typically less than 100 nm) that are populated on the substrate 12 although the dimension does not necessarily have to be in nanometers. More important than the absolute scale is the fact that the nanofeatures 22 are significantly smaller than the microfeatures 14. As explained in more detail below, if the substrate 12 is silicon, the nanofeatures 22 can be formed using common "black silicon" fabrication techniques. The nanofeatures 22 have a high resistance to wetting, i.e., the liquid penetrating in between the nanofeatures 22. Use of nanofeatures 22 can expand the working range of the SHPo surface 10, as illustrated in FIGS. 9A and 9B, by increasing the effective contact angle on the substrate 12. The use of nanofeatures 22 can also isolate and minimize any localized wetting conditions that occur at defects located in the SHPo surface 10. Defects would be present from manufacturing or formed during use in any SHPo surface 10 of commercial size under deployed conditions. These defect areas tend to get wet when compared to defect free areas of the SHPo surface 10. When nanofeatures 22 are disposed on the substrate 12 to make its surface more repelling to the liquid, localized wetting that occurs at these defect locations can be contained and prevented from spreading laterally.

Figure 6A:
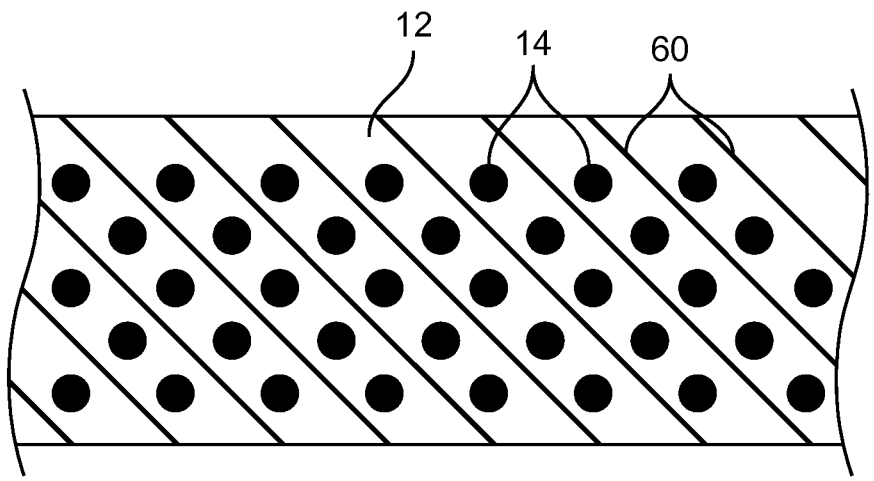
FIG. 6A illustrates a top view of a SHPo surface having post microfeatures.
Figure 6B:
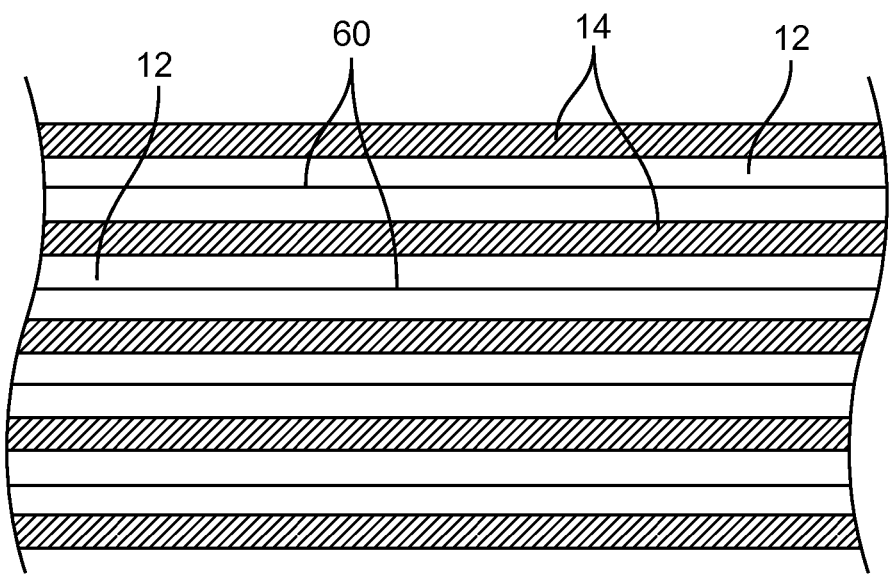
FIG. 6B illustrates a top view of a SHPo surface having grate microfeatures.

The array of microfeatures 14 that are formed on the SHPo surface 10 may take a number of forms (e.g., posts, pillars, grates). As seen in FIG. 6A, the microfeatures 14 include posts that are oriented generally orthogonal to the substrate 12. The posts or pillars may have a circular cross-sectional shape as illustrated in FIG. 6A or, alternatively, they may have a polygonal or some other shape. FIG. 6A further illustrates a gas generator 18 in the form of an electrode 60 that extends across the substrate 12. While FIG. 6A illustrates posts or pillars in connection with an electrode 60, it should be understood that posts or pillars can be used with other gas generation modalities discussed herein. FIG. 6B illustrates the microfeatures 14 in the form of grates that are disposed atop the substrate 12. The grates are periodic "walls" that populate the surface of the substrate 12. The grates have similar heights (e.g., micrometers) as those used in the posts or pillars. The SHPo surfaces comprising grates disposed parallel to the flow direction are generally more effective for drag reduction applications compared with the SHPo surfaces comprising posts. In embodiments in which the microfeatures are posts or grates, optional nanofeatures 22 may populate the substrate 12 as described above with respect to FIGS. 4A and 4B.

FIGS. 7A-7D illustrate SHPo surface 10 starting in a non-wetted state (FIG. 7A) that then becomes partially wetted (FIG. 7B). Such partial wetting may result from any number of factors including, increased pressure of the liquid 100, loss of the gas 20 by diffusion into liquid 100, or defects formed in the SHPo surface 10. FIG. 7C illustrates additional wetting of the SHPo surface 10 until a completely wetted state is reached. The wetted state triggers the gas generator 18 to begin generating gas 20. Gas is generated at or near the surfaces within the microfeatures 14 and proceeds to push the invading liquid 100 back as illustrated by the arrows in FIG. 7D. Gas generation continues until the non-wetted or dewetted state is restored as illustrated in FIG. 7A. Generation of the gas 20 is self-regulated in that the gas generators 18 do not initiate until the SHPo surface 10 has become at least partially wetted. The gas generators 18 continue until the SHPo surface 10 is dewetted. FIG. 7 illustrates dewetting (FIG. 7D) from a fully wetted state (FIG. 7C) to address the worst-case scenario. In reality, the dewetting process starts as soon as any portion of the microfeatures 14 is wetted (akin to FIG. 7B), so the surface 12 stays nonwetted virtually all the time.

FIGS. 8A-8G illustrate a method of fabricating a SHPo surface 10 according to one embodiment. In this embodiment, optional nanofeatures 22 are formed on the substrate 12 using a well-known "black silicon" method as illustrated in the SHPo surface 10 of FIGS. 4A and 4B. Referring to FIG. 8A, a substrate 12 such as a silicon wafer is provided. In FIG. 8B, nanofeatures 22 are formed by the generation of random nanostructures on the substrate 12. In the "black silicon" method, a deep reactive ion etching (DRIE) process that includes a deposition step, first etch and second etch creates needle-like structures on the substrate 12. In essence, randomly deposited polymer during the deposition step functions as micromasks for subsequent etching steps. The term "black silicon" comes from the fact that when used on a silicon substrate 12, the surface appears black in color because the nanofeatures 22 absorb incoming light. Additional details regarding the black silicon method may be found in Choi et al., Large slip of aqueous liquid flow over a nanoengineered superhydrophobic surface, Phys. Rev. Lett. 96, 066001 (2006), which is incorporated by reference herein.

With reference to FIG. 8C, the substrate 30 is cleaned using $O_2$ plasma and Piranha solution ($H_2SO_4:H_2O_2$=4:1 by volume) to remove polymeric residues deposited during the black silicon method and an electrode 60 layer is deposited over the nanofeatures 22. The electrode layer 60 may includes multiple deposited metal layers, e.g., a 10 nm thick Cr layer and a 200 nm thick Au layer. To pattern the electrode layer 60, photolithographic techniques such as those illustrated in FIGS. 8D and 8E may be employed. For instance, 8 µm thick positive PR layer 32 (AZ 4620) can be spin-coated atop the nanofeatures 22 at 3000 rpm and soft-baked for 100 seconds at 110° C. Then, the PR layer 32 can be exposed to ultraviolet (UV) light (160 mJ) through a photomask using Karl Suss MA6 and developed in diluted AZ 400K developer (AZ 400K:de-ionized water=1:4 by volume). With reference to FIG. 8E, the exposed metal layers are wet-etched (i.e., removed) using an etchant for each metal layer. Finally, the remaining PR layer 32 was removed by rinsing with acetone, methanol, and de-ionized water and then applying $O_2$ plasma for a complete removal of PR.

Next, with reference to FIG. 8F, microfeatures 14 are patterned on the nanofeatures 22 using photolithography. First, 50 µm thick negative PR (KMPR1050, Microchem Co.) was spin-coated on nanofeatures 22 at 3000 rpm and then soft-baked on a hot plate, while ramping up temperature from 60 to 100° C. with 1° C./minute and maintaining 100° C. for 20 min afterward. The gradual ramping up of temperature enhanced the quality of the PR film by helping reduce bubble formation and wrinkling on the PR coating. Then, microfeatures 14 (which may be posts or grates) are directly patterned out of the PR film as seen in FIG. 8F. The microfeatures 14 may have varying pitches or gas fractions. The gas fraction is defined by the ratio of the empty area of the SHPo surface 10 to the total area of the SHPo surface 10 (varies between 0 and 1.0). After the KMPR film was exposed to UV light (2000 mJ) through a photomask using Karl Suss MA6 and was baked at 100° C. for 4 min, it was developed in SU-8 developer, rinsed with iso-propanol, and blow-dried with $N_2$ gases. To turn the surface hydrophobic, an optional hydrophobic layer 34 was formed over the SHPo surface 10. The hydrophobic layer 34 may include 2 wt % PTFE (Teflon AF solution—DUPONT) which can be spin-coated on the surface.

When a gas 20 grows to displace the liquid present within the microfeatures 14 in a wetted state, the gas 20 would form individual bubbles and leave the surface unless it is energetically more favorable to grow into a continuous layer filling the microfeatures 14. The surface energy is determined by several factors: the height-to-pitch ratio of the microfeatures 14, gas fraction of the SHPo surface 10, and the contact angle of the liquid on the surface of the substrate 12 between microfeatures 14. On the other hand, the height-to-pitch ratio should be large enough so that the meniscus never sags and touches the substrate by the liquid pressure.

The geometric criterion that satisfy the above conditions so that a stable layer of gas can be formed within the microfeatures 14 in the form of posts is represented by the following Equation (Eq. 1):

$$(\sqrt{2} - 2\sqrt{(1-\phi)/\pi})\frac{-1+\sin\theta_{p,adv}}{2\cos\theta_{p,adv}} < \quad \text{(Eq. 1)}$$

$$H/L < \frac{-\cos\theta_{b,rec}}{2\sin\theta_{p,rec}(1 - \sqrt{\pi(1-\phi)}/\phi)},$$

where $\phi$, H, L, and $\theta$ are the gas fraction ($\phi=1-\pi D^2/4L^2$, D: diameter of posts), height and pitch (center-to-center distance) of the posts, and contact angle, respectively. As the subscripts of $\theta$, adv and rec denote advancing and receding and p and b refer to the surface of the posts and the bottom surface (i.e., substrate surface) between the posts, respectively.

The geometric criterion that satisfy the above conditions so that a stable layer of gas can be formed within the microfeatures 14 in the form of grates is represented by the following Equation (Eq. 2):

$$H/L > \max\left[\frac{-(1+\cos\theta_{b,rec})\phi}{2\cos\theta_{g,rec} + 2\sin\theta_{g,rec}}, \frac{(1-\sin\theta_{g,adv})\phi}{2}\right] \quad \text{(Eq. 2)}$$

where the subscript g refers to the surface of the grates.

FIGS. 9A and 9B illustrate how the presence of the nanofeatures 22 on the substrate 12, by increasing the contact angle $\theta_b$, expands the above design criteria which are graphically presented as "acceptable zone" in the FIGS. The acceptable zone is where the gas 20 spreads laterally to form a layer of gas 20 rather than leaving the surface as bubbles during gas generation and does not prematurely collapse once a stable layer of gas 20 is formed. FIG. 9A illustrates height/pitch as a function of gas fraction for microfeatures 14 in the form of posts, while FIG. 9B illustrates height/pitch as a function of gas fraction for microfeatures 14 in the form of grates. As seen in both FIGS. 9A and 9B the area of the acceptable zone increases when the receding contact angle ($CA_{b,rec}$) on the surface of the substrate 12 increases from 110° (substrate 12 without nanofeatures 22) to 173.4° (substrate 12 with nanofeatures 22).

Testing with a SHPo surface 10 having nanofeatures 22, the SHPo surface 10 was able to maintain a perfect layer of gas 20 under water for up to 7 atm as the pressure of newly generated gas 20 automatically adapted to the surrounding liquid pressure. Further, the presence of the nanofeatures 22 assisted gas restoration on artificially defective surfaces by confining the wetting area only to the defected region without propagating to the surrounding area.

The methods and devices described herein can significantly expand the applicability of a SHPo surface 10 to a number of practical applications involving high liquid pressure (e.g., deep hull of large boats, submarines, pipe flows) or biofouling. For example, the underwater pressure on the hull of most large ocean liners ranges up to 1-3 atm; the pressure is much higher for submarines. High pressures may also exist in pressurized conduits or pipes which may contain the SHPo surface 10. Biofouling is an issue for marine structures as well as all the above marine vehicles.

To confirm that the restoration of the film of gas 20 indeed recovers the drag reduction, slip lengths on the SHPo surface 10 were measured for both microgrates and microposts by measuring drag of water using a rheometer. For the SHPo surface 10 that included microgrates as the microfeature 14, the microgrates (concentric array of microgrates) were separated by a 80 μm pitch and the SHPo surface 10 had a 80% gas fraction. For the SHPo surface 10 that included microposts as the microfeature 14, the microposts were separated by a 50 μm pitch and the SHPo surface 10 had a 90% gas fraction. For both embodiments, the gas generator 18 was in the form of an electrode 60 and nanofeatures 22 were present on substrate 12.

Figure 10:
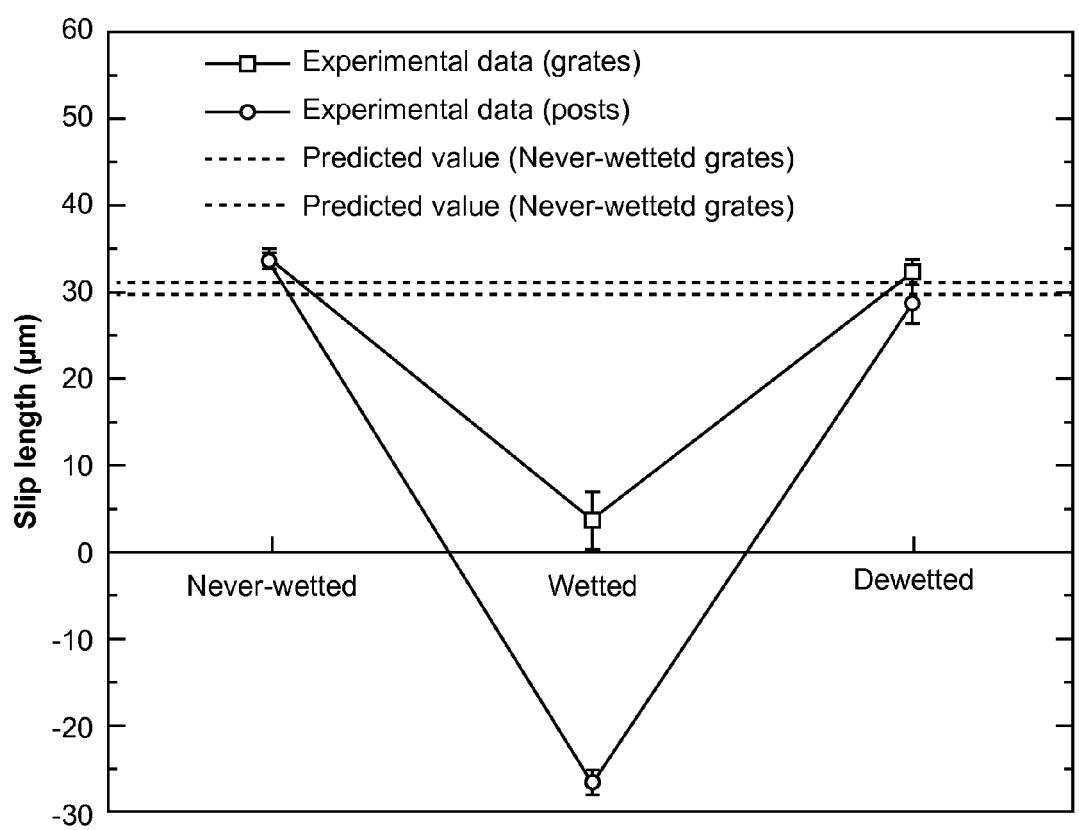
FIG. 10 illustrates a graph of slip length measurements made with intentional wetting and dewetting of SHPo surface (grates and posts) underwater.

To start, the slip lengths on non-wetted surfaces were measured to be consistent with theoretical values for grates and posts (identified as "Never-wetted" in FIG. 10—voltage on). After the SHPo surface 10 was wetted (by diffusing away the gas in the microstructures to the bulk water), the slip was lost ("Wetted" in FIG. 10—voltage off), as expected. When gas films were restored on the surfaces by the electrolytic gas regeneration using electrodes 60, the slip lengths were found to approach the values obtained before the wetting, confirming that the regenerated gas layer is as effective as the original gas layer in inducing a liquid slip ("Dewetted" in FIG. 10—voltage on). Each error bar represents the standard deviation of five data points.

As stated herein, the SHPo surface 10 may be useful in a wide number of applications, where superhydrophobicity inside a liquid is beneficial, e.g., drag reduction, prevention of biofouling. For example, the SHPo surface 10 may be disposed on the hull of a vessel or other device that is propelled in a water environment (e.g., marine vessel, submarine). Similarly, the SHPo surface 10 may be disposed on the interior surface of a pipe or conduit that carries water or other liquids.

Another aspect of the SHPo surface 10 is the ability to resist fouling including biofouling on the surface 10. Biofouling is a serious problem with economic consequences such as marine transportation (i.e., increased drag) and pipelines (i.e., increased pumping energy, reduced lifetime). Previous approaches to address the issue mostly involved toxic antifouling coatings, which resulted in adverse environment effects, and their usage was internationally banned in recent years. As an alternative, there has been active research to develop non-toxic solutions to the biofouling problems. One promising approach is to use microstructured or nanostructured hydrophobic surfaces (i.e., SHPo surfaces). Such surfaces were found to work as anti-fouling surfaces under laboratory conditions. However, the SHPo state has never been maintained before in realistic, real-world conditions, since the trapped gas on a SHPo surface is easily depleted in reality thus resulting in a loss of the SHPo state. The SHPo surface 10 described herein is able to maintain the SHPo state in realistic conditions for an extended or indefinite period of time. Thus, the SHPo surface 10 is expected to prevent or inhibit biofouling of surfaces, remaining substantially free of biofouling after being exposed to a water environment for several weeks or longer. So long as the gas generator 18 operates to restore the gas layer to the SHPo surface 10 the surface may prevent biofouling, in theory, indefinitely.

While gas generation replenishes and maintains the layer of gas on the SHPo surface 10, the surface may be further modified to strengthen the anti-biofouling properties. For example, top surfaces of the SHPo surface 10 do not need to be hydrophobic (e.g., they can be hydrophilic) provided the sidewalls of the microfeatures 14 remain hydrophobic. Thus, an existing anti-biofouling material (e.g., coating), which may be hydrophilic in nature, can be applied only onto the top surfaces of the SHPo surface 10 without compromising the SHPo property of a given SHPo surface.

While embodiments have been shown and described, various modifications may be made without departing from the scope of the inventive concepts disclosed herein. The invention(s), therefore, should not be limited, except to the following claims, and their equivalents.

What is claimed is:

1. A superhydrophobic surface substantially immersed in water comprising:
    a substrate substantially immersed in the water;
    a plurality of microfeatures in the shape of posts or grates extending away from the substrate and substantially separated from one another by a distance and oriented substantially orthogonal to a surface of the substrate, wherein adjacent microfeatures define spaces there between;
    a plurality of gas generators disposed on or embedded in the substrate or microfeatures;
    wherein each gas generator is configured to automatically generate one of hydrogen gas ($H_2$) or oxygen gas ($O_2$) within the respective space when water invades the space and contacts the gas generator and wherein gas generation automatically stops when water is expelled from the space by the generated hydrogen gas ($H_2$) or oxygen gas ($O_2$); and
    wherein the gas fraction, contact angles, and height (H) to pitch (L) ratio of the microfeatures are within a range that directs the generated hydrogen gas ($H_2$) or oxygen gas ($O_2$) to grow into a substantially continuous layer of gas filling the spaces between the microfeatures rather than allowing the generated hydrogen gas ($H_2$) or oxygen gas ($O_2$) to form individual bubbles of gas leaving the superhydrophobic surface during filling of the spaces.

2. The superhydrophobic surface of claim 1, wherein the substrate further comprises a plurality of nanofeatures disposed thereon.

3. The superhydrophobic surface of claim 1, wherein the microfeatures further comprises a plurality of nanofeatures disposed thereon.

4. The superhydrophobic surface of claim 1, wherein the gas generators comprise electrodes coupled to a source of electrical power.

5. The superhydrophobic surface of claim 4, wherein the electrodes are disposed on or embedded in the surface of the substrate or microfeatures.

6. The superhydrophobic surface of claim 1, wherein the gas generators comprise a chemical reactant.

7. The superhydrophobic surface of claim 1, wherein the surface is located on the hull of a vessel.

8. The superhydrophobic surface of claim 1, wherein the surface is located on an interior surface of a pipe.

9. The superhydrophobic surface of claim 1, wherein the gas generators comprise a metal.

10. The superhydrophobic surface of claim 1, wherein the superhydrophobic surface has a gas fraction greater than or equal to 80%.

11. The superhydrophobic surface of claim 1, wherein the superhydrophobic surface has a gas fraction greater than or equal to 90%.

12. A superhydrophobic surface substantially immersed in water comprising:
    a substrate substantially immersed in the water;
    a plurality of microfeatures in the shape of posts or grates extending away from the substrate and substantially separated from one another by a distance and oriented substantially orthogonal to a surface of the substrate, wherein adjacent microfeatures define spaces there between;
    a plurality of gas generating electrodes disposed on or embedded in the surface of the substrate or microfeatures;
    a power source coupled to the gas generating electrodes, wherein the gas generating electrodes are configured to automatically generate one of hydrogen gas ($H_2$) or oxygen gas ($O_2$) within the respective space when the water invades the space and contacts the gas generating electrode and wherein hydrogen gas ($H_2$) or oxygen gas ($O_2$) generation automatically stops when water is expelled from the space by the generated hydrogen gas ($H_2$) or oxygen gas ($O_2$); and
    wherein the gas fraction, contact angles, and height (H) to pitch (L) ratio of the microfeatures are within a range that directs the generated hydrogen gas ($H_2$) or oxygen gas ($O_2$) to grow into a substantially continuous layer of gas filling the spaces between the microfeatures rather than allowing the generated hydrogen gas ($H_2$) or oxygen gas ($O_2$) to form individual bubbles of gas leaving the superhydrophobic surface during filling of the spaces.

13. The superhydrophobic surface of claim 12, wherein the substrate further comprises a plurality of nanofeatures disposed thereon.

14. The superhydrophobic surface of claim 12, wherein the microfeatures further comprises a plurality of nanofeatures disposed thereon.

15. The superhydrophobic surface of claim 12, wherein the superhydrophobic surface has a gas fraction greater than or equal to 80%.

16. The superhydrophobic surface of claim 12, wherein the superhydrophobic surface has a gas fraction greater than or equal to 90%.

* * * * *